United States Patent
Lim

(10) Patent No.: US 7,594,042 B2
(45) Date of Patent: Sep. 22, 2009

(54) EFFECTIVE CACHING MECHANISM WITH COMPARATOR COUPLED TO PROGRAMMABLE REGISTERS TO STORE PLURALITY OF THRESHOLDS IN ORDER TO DETERMINE WHEN TO THROTTLE MEMORY REQUESTS

(75) Inventor: Su Wei Lim, Selangor (MY)

(73) Assignee: Intel Corporation, Santa Clara, CA (US)

( * ) Notice: Subject to any disclaimer, the term of this patent is extended or adjusted under 35 U.S.C. 154(b) by 525 days.

(21) Appl. No.: 11/480,669

(22) Filed: Jun. 30, 2006

(65) Prior Publication Data

US 2008/0005513 A1    Jan. 3, 2008

(51) Int. Cl.
*G06F 12/14* (2006.01)
*G06F 12/00* (2006.01)
*G06F 13/00* (2006.01)

(52) U.S. Cl. .............. 710/23; 710/8; 710/22; 710/34; 710/52; 710/107; 711/118; 711/151; 711/163

(58) Field of Classification Search .............. 710/8, 710/22, 34, 52, 23, 107; 711/118, 151, 163
See application file for complete search history.

(56) References Cited

U.S. PATENT DOCUMENTS

| | | | |
|---|---|---|---|
| 6,785,776 B2 * | 8/2004 | Arimilli et al. | 711/144 |
| 6,785,790 B1 * | 8/2004 | Christie et al. | 711/163 |
| 7,185,149 B2 * | 2/2007 | Okamura | 711/139 |
| 7,296,127 B2 * | 11/2007 | Safranek et al. | 711/163 |
| 7,474,670 B2 * | 1/2009 | Nowshadi | 370/462 |
| 2003/0023783 A1 * | 1/2003 | Arimilli et al. | 710/22 |

* cited by examiner

*Primary Examiner*—Tammara Peyton
(74) *Attorney, Agent, or Firm*—Blakely, Sokoloff, Taylor & Zafman LLP

(57) ABSTRACT

A system includes a plurality of bus masters that generate direct memory access requests to access a protected memory device. Before granting the access, the system checks for memory protection information stored in a cache. The cache is shared by the bus masters and allocation of the cache entries is prioritized among the bus masters.

15 Claims, 4 Drawing Sheets

NUMBER OF ALLOCATABLE CACHE ENTRIES

EFFECTIVE CACHING MECHANISM WITH COMPARATOR COUPLED TO PROGRAMMABLE REGISTERS TO STORE PLURALITY OF THRESHOLDS IN ORDER TO DETERMINE WHEN TO THROTTLE MEMORY REQUESTS

BACKGROUND

1. Field

Management of cache resources in a protected computing environment.

2. Background

Various security techniques have been developed to protect sensitive data stored on a computer. For example, the LaGrande Technology developed by the Intel™ Corporation in Santa Clara, Calif., provides a secure computing environment by protecting data storage, software execution, and input/output devices against malicious software attacks. The LaGrande Technology defines hardware modifications to a computing system to ensure data security on the system.

One form of software attacks may aim towards the main memory of a computing system. To protect the main memory from unauthorized access, a request for direct memory access may be checked for permission before the access is granted. Typically, a direct memory access (DMA) controller moves data in and out of the main memory without requiring a central processing unit (CPU) to perform tasks for the memory access. However, a software attacker may take advantage of the direct access to copy or even alter the contents of the main memory. Thus, in some systems, sensitive data is often stored in an area of the memory that can only be accessed by the CPU. A DMA request is granted if the target memory address does not contain sensitive information to be protected.

In some systems, a NODMA (No Direct Memory Access) table in the main memory is checked before any DMA request is granted. The NODMA table uses one bit to represent protection information for each 4K-byte pages of the main memory. The value of the bit indicates whether the corresponding memory pages can be directly accessed. Thus, based on the target address of a DMA request, a hardware module prefetches the bit corresponding to the target address from the NODMA table. Depending on the value of the bit, DMA may proceed or may be denied.

DMA is generally initiated by one of a plurality of I/O devices, or equivalently, bus masters. As each request of the bus masters is checked with the NODMA table in the main memory, a severe bottleneck is formed at the memory interface.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
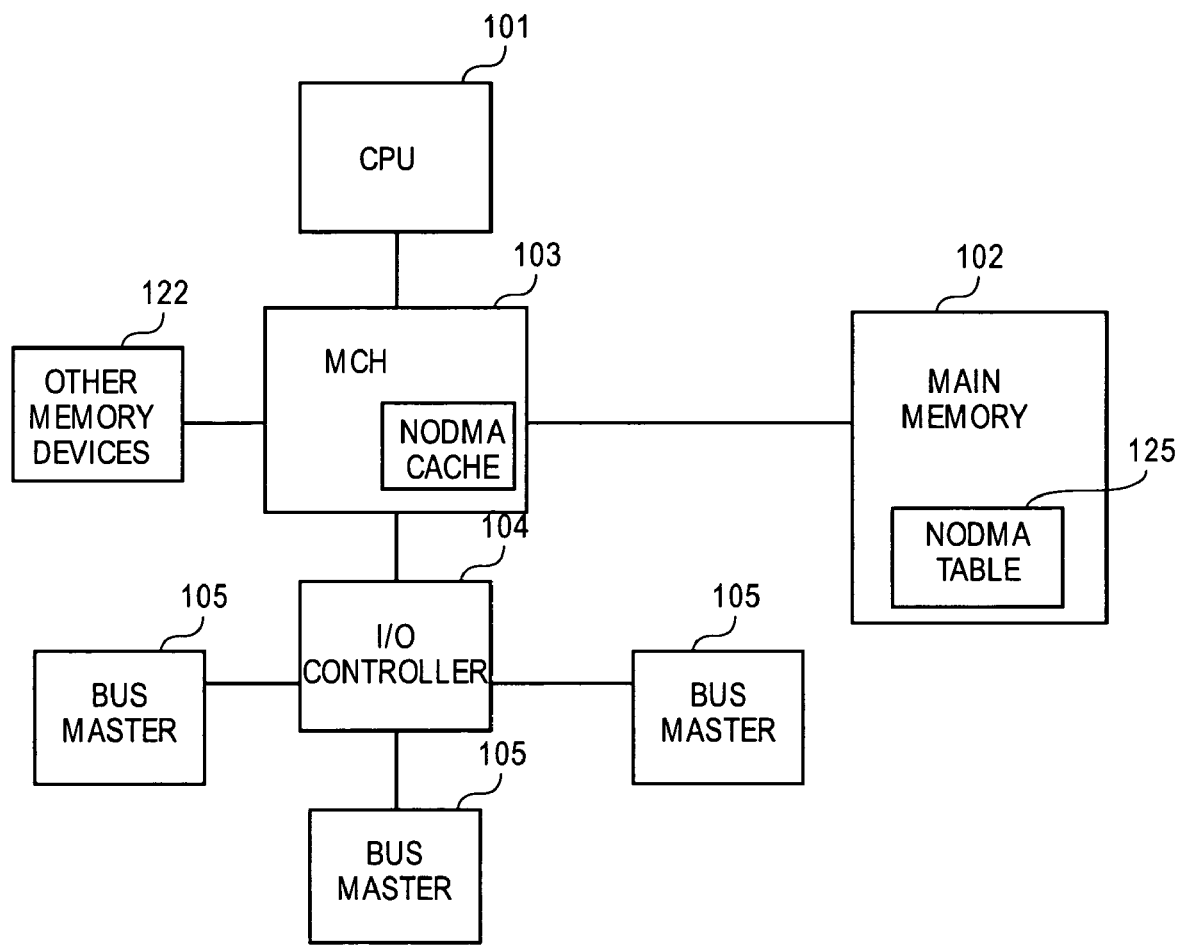
FIG. 1 is a block diagram of an embodiment of a system including a protected memory device coupled to a memory control hub (MCH) including a NODMA (No Direct Memory Access) cache.

FIG. 1 shows an embodiment of a system 100 including a central processing unit (CPU) 101 coupled with main memory 102 and other memory devices 122 through a memory controller (MCH) 103. Main memory 102 may comprise one or more types of memory such as, for example, dynamic random access memory (DRAM) devices, synchronous dynamic random access memory (SDRAM) devices, double data rate (DDR) SDRAM devices, or other volatile memory devices. Other memory devices 122 may comprise graphics cards or any volatile or non-volatile memory devices.

In one embodiment, MCH 103 is coupled with an input/output (I/O) controller 104. I/O controller 104 provides an interface for CPU 101 and other components of system 100 to access to one or more I/O devices, or equivalently, bus masters 105. Bus masters 105 may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications.

In one embodiment, some portions of main memory 102 may be protected from bus master initiated cycles. A bus master initiated cycle is a request issued by bus master 105 for directly accessing main memory 102. In some embodiment, portions of main memory 102 may also be protected from the access by graphics cards 122. The protection may be in the form of checking the request for permission before granting an access. The request may be denied if the requested memory address is protected. A protected memory address may be accessible to CPU 101 but is not accessible to the bus masters that initiate direct memory access (DMA) requests.

In one embodiment, main memory 102 stores the protection information in a NODMA table 125. Each one-bit entry in NODMA table 125 indicates whether a corresponding 4K-byte page of main memory 102 is protected. For example, a "1" bit indicates that the corresponding 4K-byte page is forbidden from DMA by the bus masters. Thus, if a bus master initiates a DMA request to that 4K-byte page, the request will be denied.

Figure 2:
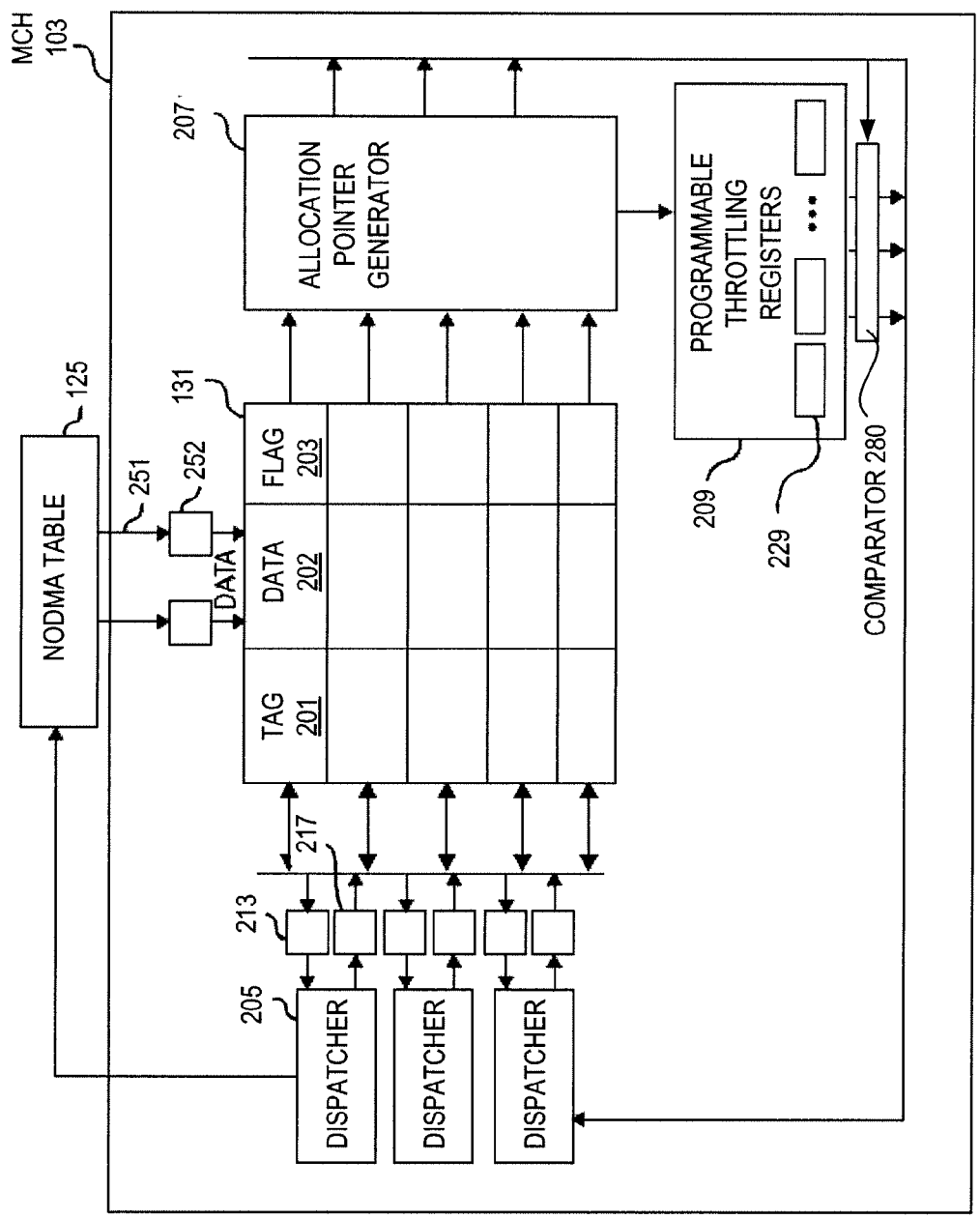
FIG. 2 is a block diagram of an embodiment of the NODMA cache.

In one embodiment, a portion of NODMA table 125 is cached in NODMA cache 131. NODMA cache 131 stores recently accessed entries of NODMA table 125. NODMA cache 131 may be shared by all of bus masters 105. Referring to FIG. 2, in one embodiment, each entry of NODMA cache 131 includes a tag portion 201 and a data portion 202. Tag portion 201 stores a memory address that is being requested by a bus master for DMA at 4K page granularity. Data portion 202 stores a 32-bit protection information, each bit indicating whether a corresponding 4K-byte main memory 102 is protected. Thus, each of the cache entries includes page protection information for thirty-two 4K byte pages, 128K bytes in total.

Data portion 202 of the cache entries is a copy of the NODMA table 125 entries. When a bus masters 105 requests access to main memory 102, the memory address in the request is compared against tag portion 201 of NODMA cache 131. If there is a hit, the request will be granted or denied depending on data portion 202 of that cache entry. If there is a miss, protection information may be fetched from NODMA table 125 and copied into NODMA cache 131.

Some or all of bus masters 105 may generate DMA requests concurrently. NODMA cache 131 may be coupled to a plurality of lookup ports 213 to allow concurrent accesses and a plurality of write ports 217 to allow updates to the cache contents. The number of lookup ports 213 may be the same as the number write ports 217 and also the same as the number of the bus masters 105 that are capable of generating DMA requests in parallel. In one embodiment, the requests are submitted to one of a plurality of dispatchers 205 that are coupled to NODMA cache 131 and main memory 102. The number of dispatchers 205 may be the same as the number of lookup ports 213 or write ports 217. Dispatcher 205 may concurrently check NODMA cache 131 for all the bus masters that submit DMA requests. If a requested memory address is located in NODMA cache 131, dispatcher 205 retrieves the protection information from NODMA cache 131. The protection information is used by dispatcher 205 to deny or allow the access to the target memory address. If the requested memory address is not in NODMA cache 131, dispatcher 205 fetches the corresponding NODMA table 125 entry in main memory 102 and loads the fetched entry into the NODMA cache 131.

Dispatcher 205 coordinates the resource allocation for NODMA cache 131 based on the feedback from a programmable throttling register 209 to be described below. If the cache lookup by dispatcher 205 results in a miss, dispatcher 205 directs a requested memory address to a write port 217 of cache 131. The requested memory address may be written into tag portion 201 of one of the allocatable cache entries. Dispatcher 205 then uses a processed version of the requested memory address, referred herein as a NODMA fetch address, to fetch the corresponding protection information in NODMA table 125. The NODMA fetch address may be a function of the offset within NODMA table 125 and the base address where the NODMA table is located in memory 102. Dispatcher 205 converts the requested memory address to the NODMA fetch address based on the NODMA table base address and the offset within NODMA table 125 to locate the candidate for fetch. The fetched information is written via one of memory channels 251 and fetch completion write ports 252 into cache 131.

NODMA cache 131 includes a flag 203 for each cache entry to indicate whether the cache entry is allocatable. Flag 203 may have three states: invalid, valid, and pending. The initial state of flag 203 is invalid. Flag 203 is set to the pending state after the corresponding cache entry is allocated to a DMA request that results in a miss, but before the memory fetch is completed. A pending flag 203 indicates that the corresponding cache entry is non-allocatable. That is, a cache entry is not allocatable if its tag portion 201 stores a requested memory address but its data portion 202 is still awaiting the completion of a memory fetch. Flag 203 is changed to the valid state once the memory fetch is completed. A valid flag 203 indicates that the corresponding cache entry is valid and allocatable. A cache hit occurs only if the looked-up cache entry has a valid flag 203.

In one embodiment, cache 131 may be coupled to an allocation pointer generator 207 that locates allocatable cache entries. When there are sufficient allocatable cache entries, allocation pointer generator 207 may locate the same number of allocation pointers as the number of the bus masters 105 that generate DMA requests. The allocation pointer points to the cache entry having a flag 203 indicating it as allocatable. Allocation pointer generator 207 may transmit the allocation pointers to dispatcher 205. Dispatcher 205 may use the allocation pointers to assign one of the corresponding cache entries to a bus master 105 when a DMA request initiated by the bus master results in a cache miss.

Bus masters 105 may have different timing requirements (e.g., bandwidth and/or latency). Some of bus masters 105 may require higher bandwidth (e.g., a video display) or lower latency (e.g., audio output) than some other bus masters 105 (e.g., a keyboard or a printer). As bus masters 105 may initiate requests faster than memory fetches, NODMA cache 131 may exhaust all of its allocatable entries as a result of incomplete memory fetches. Thus, DMA requests generated by bus masters 105 may be prioritized based on their different timing requirements. If the requests are not prioritized, allocatable cache entries could be used up by the low priority bus masters 105. When NODMA cache 131 runs out of allocatable entries, all DMA requests will be throttled. Thus, when the number of allocatable cache entries falls below a predetermined threshold, DMA requests from low priority bus masters 105 may be throttled. Cache entries may still be pre-allocated to high priority bus masters 105 in case there is a cache miss.

In one embodiment, a plurality of programmable throttling registers 209 including a plurality of register cells 229 may be used to store a programming threshold for each of bus masters 105. Throttling registers 209 receive the number of allocatable cache entries from allocation pointer generator 207. Throttling registers 209 are coupled to a comparator 280. When the comparator 280 determines that the number allocatable cache entries falls below a threshold for the corresponding bus master 105, all DMA requests from that bus masters will be throttled until the allocatable entries rise above that threshold. In one embodiment, throttling registers 209 may transmit the throttling decision in the form of a control signal, indicating whether the DMA requests from a corresponding bus master 105 should be throttled. The control signal may be transmitted to dispatcher 205. Based on the state of the control signal, dispatcher 205 may determine whether it should look up cache 131 to service a DMA request, or should hold that request in a queue until a different throttling decision is received from throttling registers 209. As the cache resources become more scarce, more and more DMA requests are throttled. Thus, the remaining cache entries are dedicated to the high priority bus masters 105 such that high priority requests are not affected by the low priority requests.

In one embodiment, the threshold for each bus masters 105 may be calculated as a function of memory latency, frequency of cacheline requests issued by the bus master, and the priority of the bus master. Memory latency measures from the time a lookup in NODMA cache 131 is performed until the time memory fetch is completed and a new entry in cache 131 becomes allocatable. For example, assume that memory latency is 20 μs. Also assume that cacheline requests from a highest-priority bus master A, a second-highest-priority bus master B, and a lowest-priority bus master C are issued every 10 μs, 1 μs, and 2 μs, respectively. A threshold for bus master B may be 20 μs/10 μs=2 (cache entries). A threshold for bus master C may be (20 μs/1 μs)+(threshold for bus master B)=20+2=22 (cache entries). Bus master A, having the highest priority among the three, may be programmed to have a threshold of zero.

Figure 3:
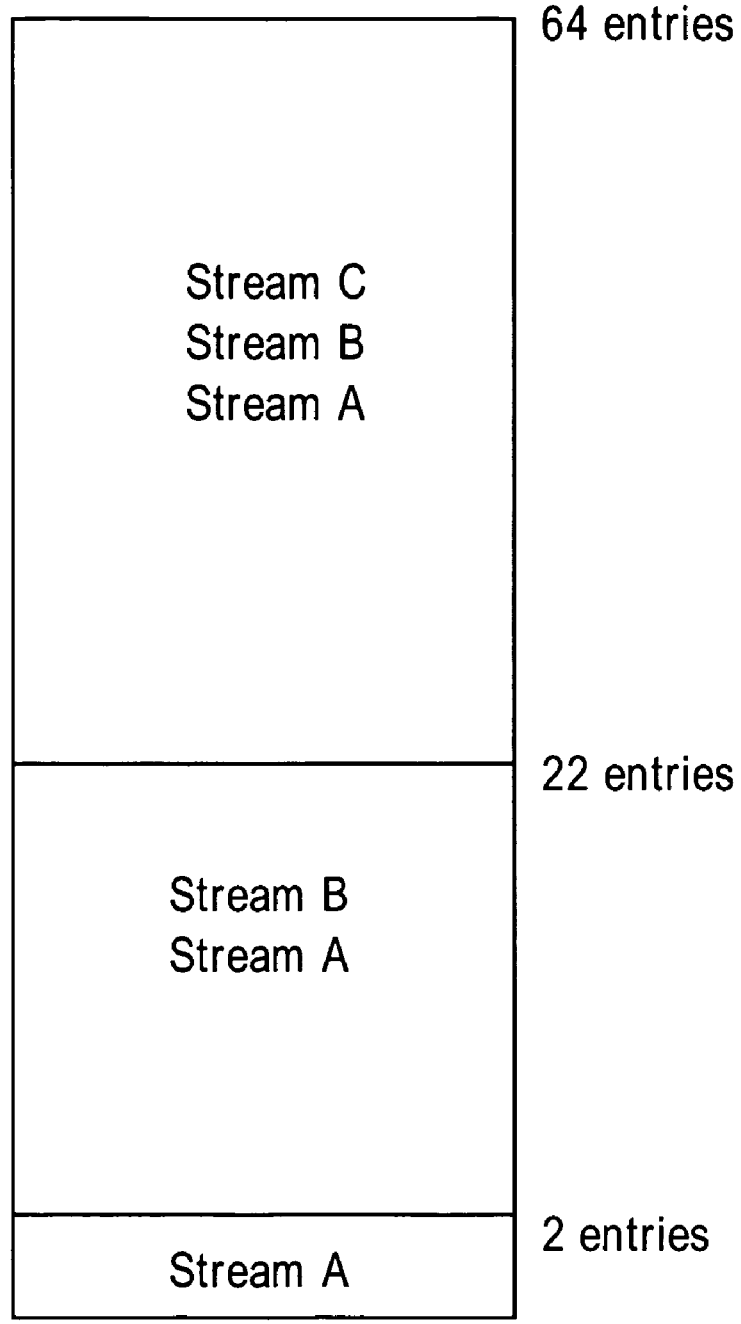
FIG. 3 is a block diagram showing an example of prioritizing the allocation of the NODMA cache entries.

FIG. 3 shows an example of cache resource prioritization according to the above threshold calculations. In the example, a NODMA cache 300 includes 64 entries. All of the bus masters A, B, and C may share the cache entries when the number of allocatable entries is between 64 and 23. When the number of allocatable entries is equal to or less than 22, request streams from bus master C may be throttled, dedicating the remaining resources to bus masters A and B. When the number of allocatable entries is equal to or less than 2, request streams from bus master B may also be throttled, dedicating the remaining resources to bus master A. Request streams from bus master A will be throttled only when NODMA cache 300 is full.

The priority-based programmable thresholds provide a mechanism to distinguish between the priorities of different request streams and achieve effective resource allocation for NODMA cache 300. The lower priority streams would be throttled more often compared to higher priority streams as the resources of NODMA cache 300 becomes more scarce. By dedicating the remaining NODMA cache entries to the higher priority streams, better performance for the higher priority streams may be achieved.

Moreover, sharing a single NODMA cache 300 among multiple request streams with different latency or bandwidth requirements may improve the overall hit rate for all the streams. As each NODMA memory fetch initiated by a particular streams returns the page protection information for thirty-two memory pages (of 4K each), other streams may take advantage of this "prefetched" information in their cache lookups if the target address of other streams falls within any one of the thirty-two memory pages.

Referring back to FIG. 2, in an alternative embodiment, a dedicated NODMA cache may be assigned to each bus master 105 to remove the contentions for cache entries among the bus masters. However, having a single NODMA cache 131 is more gate-efficient compared to having dedicated NODMA caches for each bus master 103. As mentioned above, it is possible for different streams to target different 4K pages which are part of the same NODMA entry. Using a dedicated NODMA caches for each stream are would result in caching redundant entries, and thus wasting resources. Having a shared NODMA cache may remove these redundant entries and reduce the gate count for the same hit rate.

Figure 4:
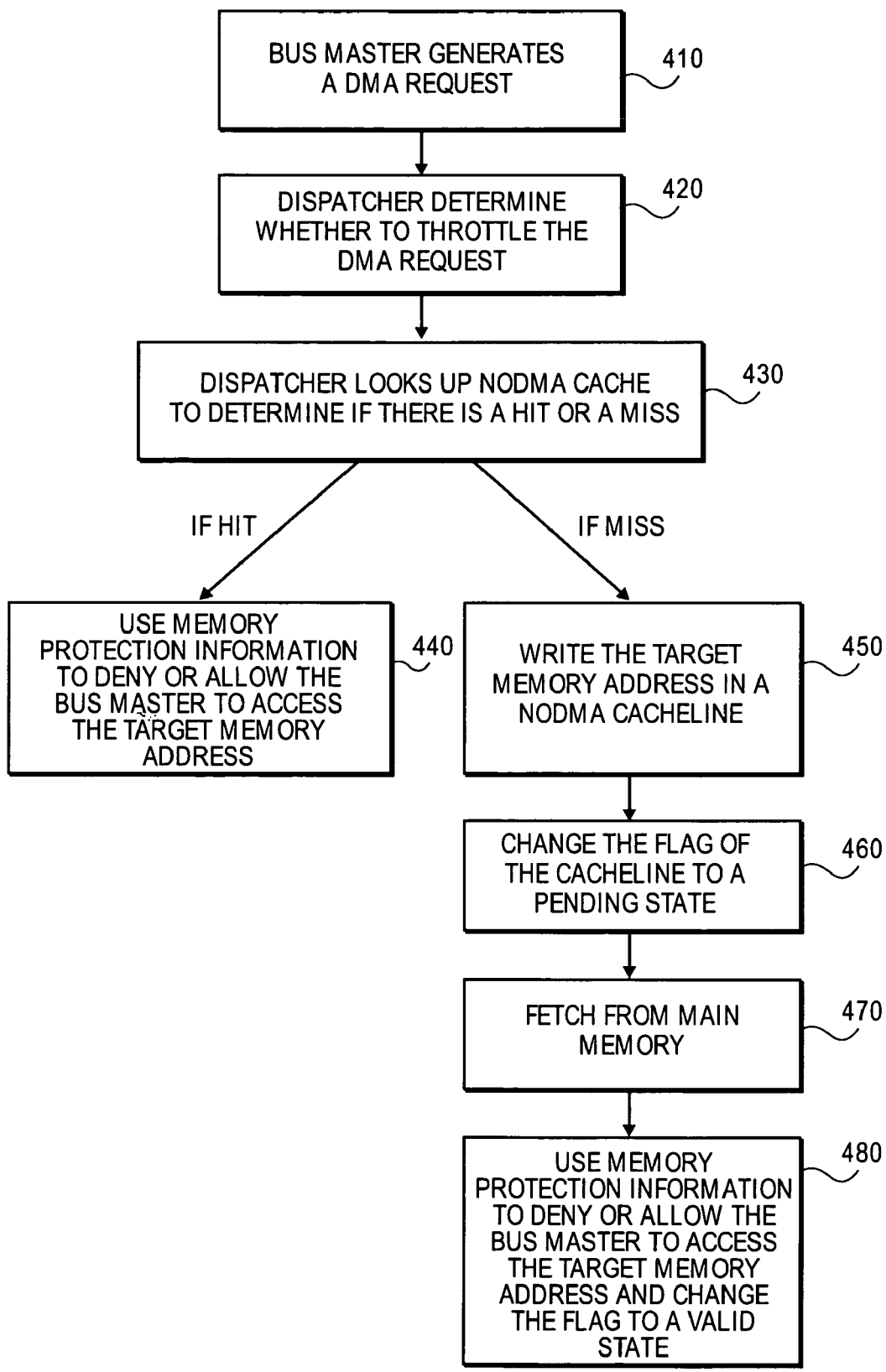
FIG. 4 is a flowchart showing an example of using the NODMA cache.

FIG. 4 is a flowchart showing an example of using a NODMA cache. Also referring to FIG. 2, at block 410, one or more bus masters 105 may generate DMA requests. At block 420, dispatcher 205 may determine whether the DMA requests should be throttled according to the information transmitted from throttling registers 209. The information from throttling registers 209 may be based on a programmable threshold for each bus master 105. The programmable threshold may be calculated based on memory latency, frequency of DMA cacheline requests, and the priority of the corresponding bus master 105. If any of the requests should be throttled, dispatcher 205 may hold that request in a queue and process the other DMA requests that are not throttled.

At block 430, dispatcher 205 looks up NODMA cache 131 to determine whether there is a cache hit or miss for each DMA request that is not throttled. If there is a hit, at block 440, memory protection information for the requested memory address is used to deny or allow access by the bus master initiated cycle. If there is a miss, at block 450, dispatcher 205 writes the target memory address in tag portion 201 of an allocatable cache entry. A pointer to the allocatable cache entry may be generated before writing to the cache to increase efficiency. At block 460, flag 203 associated with the allocated cache entry is updated to a pending state to indicate that there is pending operation for the entry and the entry is currently not allocatable. At block 470, dispatcher 205 issues a memory fetch to main memory 102 and the protection information is retrieved from NODMA table 125 and copied into NODMA cache 131. At block 480, dispatcher 205 denies or allows access by the bus master initiated cycle, and changes the flag 203 to a valid state associated with the allocated cache entry to indicate the entry as allocatable.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
   storing memory protection information in a cache shared by a plurality of bus masters that generate direct memory access requests;
   receiving a memory access request from a requesting bus master among the plurality of bus masters;
   comparing, by a comparator, a total number of allocatable cache entries in the cache with one threshold of a plurality of thresholds that are stored in programmable registers, wherein each threshold is associated with one of the plurality bus masters, and the one threshold is associated with the requesting bus master; and
   throttling the memory access request in response to a determination generated by the comparator that the total number of allocatable cache entries is below the one threshold.

2. The method of claim 1 wherein storing memory protection information further comprises:
   storing a plurality of flags, each flag being associated with each of the cache entries to indicate whether the associated cache entry is allocatable.

3. The method of claim 2 further comprising:
   indicating the associated cache entry as not allocatable if a prior memory fetch has not completed.

4. The method of claim 1 further comprising:
   computing the one threshold as a function of a priority of the requesting bus master.

5. The method of claim 1 further comprising: computing the threshold as a function of a frequency of memory access requests generated by the bus masters having higher priorities than the requesting bus master.

6. The method of claim 1 further comprising generating an allocation pointer for each of the plurality of bus masters to indicate an allocatable entry in the cache.

7. An apparatus comprising:
   a cache to store memory protection information, the cache being shared by a plurality of bus masters that generate direct memory access requests; and
   programmable registers coupled with the cache, the programmable registers to store a plurality of thresholds, each threshold being associated with one of the plurality of bus masters; and
   a comparator coupled to the programmable registers and the cache to compare a total number of allocatable cache entries in the cache with the threshold associated with a requesting bus master that sends a memory access request, and to generate a decision to throttle the memory access request in response to a determination that the total number of allocatable cache entries is below the threshold.

8. The apparatus of claim 7 wherein the cache further comprises:
   a plurality of cache entries, each of the cache entries including a memory address being requested for access and a plurality of bits indicating whether the memory address is directly accessible.

9. The apparatus of claim 7 wherein the cache further comprises:
a plurality of flags, each flag being associated with each of the cache entries to indicate whether the associated cache entry is allocatable.

10. The apparatus of claim 7 further comprising:
an allocation pointer generator coupled to the cache to generate an allocation pointer for each of the plurality of bus masters.

11. The apparatus of claim 7 wherein the cache further comprises: a plurality of concurrent lookup ports, wherein the number of the concurrent lookup ports is same as the number the plurality of bus masters.

12. A system comprising:
a plurality of bus master to receive and respond to external requests, the plurality of bus masters being server input/output (I/O) devices;
a server memory, wherein a portion of the server memory is protected from direct access by the plurality of bus masters;
a cache to store memory protection information, the cache being shared by the plurality of bus masters; and
programmable registers coupled with the cache, the programmable registers to store a plurality of thresholds, each threshold being associated with one of the plurality of bus masters; and a comparator coupled to the programmable registers and the cache to compare a total number of allocatable cache entries in the cache with the threshold associated with a requesting bus master that sends a memory access request, and to generate a decision to throttle the memory access request in response to a determination that the total number of allocatable cache entries is below the threshold.

13. The system of claim 12 wherein the cache further comprises:
a plurality of cache entries, each of the cache entries including a memory address being requested for access and a plurality of bits indicating whether the memory address is directly accessible.

14. The system of claim 12 wherein the cache further comprises:
a plurality of flags, each flag being associated with each of the cache entries to indicate whether the associated cache entry is allocatable.

15. The system of claim 12 further comprising:
an allocation pointer generator coupled to the cache to generate an allocation pointer for each of the plurality of bus masters.

* * * * *

UNITED STATES PATENT AND TRADEMARK OFFICE
CERTIFICATE OF CORRECTION

PATENT NO. : 7,594,042 B2  Page 1 of 1
APPLICATION NO. : 11/480669
DATED : September 22, 2009
INVENTOR(S) : Lim et al.

It is certified that error appears in the above-identified patent and that said Letters Patent is hereby corrected as shown below:

In column 7, at line 15 delete, "extermal" and insert --external--.

Signed and Sealed this

Twenty-ninth Day of December, 2009

David J. Kappos
*Director of the United States Patent and Trademark Office*